United States Patent
Kumar et al.

(10) Patent No.: US 6,665,731 B1
(45) Date of Patent: Dec. 16, 2003

(54) METHOD FOR REMOTELY ACCESSING COMPONENT MANAGEMENT INFORMATION

(75) Inventors: Arvind Kumar, Beaverton, OR (US); Christopher C. Pearson, Lake Oswego, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/572,422

(22) Filed: May 16, 2000

(51) Int. Cl.⁷ .............................................. G06F 15/16
(52) U.S. Cl. ........................ 709/246; 709/203; 709/223
(58) Field of Search ................................ 709/246, 223, 709/203

(56) References Cited

U.S. PATENT DOCUMENTS 6,363,449 B1 * 3/2002 Sides et al. ................. 710/100
6,463,495 B1 * 10/2002 Angelo et al. .............. 710/305
6,502,203 B2 * 12/2002 Barron et al. .................. 714/4

\* cited by examiner

Primary Examiner—Mehmet B. Geckil
(74) Attorney, Agent, or Firm—Blakely, Sokoloff, Taylor & Zafman LLP

(57) ABSTRACT

Remotely executing programs access hardware components and upload component management information from these hardware components bypassing the operating system otherwise controlling the hardware components. A web-based browser application executes on a personal computer that is coupled to the Internet and accesses the hardware component information. Another computer that is also connected to the Internet hosts the hardware components that the web-based browser application wishes to access. The operating system of the second computer controls the operation of the hardware components. An adapter routine executing on an intermediate server, to which the hardware components are coupled and are capable of transferring component information in a predetermined format, serves as an intermediary between the web-based browser application and the hardware components. The format that the data is being transferred from the hardware components to the adapter routine is not compatible with the web-based browser application. The adapter routine converts data from the hardware components to a format acceptable to the web-based browser application, such as, for example, XML over HTTP, or any other computer language acceptable to the web-based browser application. The adapter routine also converts commands from the web-based browser application to the predetermined format required by the hardware components, such as, for example, IPMI or DMI. The web-based browser application interacts with the hardware components in a way that was heretofore not possible.

19 Claims, 4 Drawing Sheets

METHOD FOR REMOTELY ACCESSING COMPONENT MANAGEMENT INFORMATION

FIELD OF THE INVENTION

The invention described herein relates generally to methods for accessing hardware component information. More particularly, the invention relates to a method for accessing hardware component information without passing through an operating system controlling the component's interaction via a remote application.

COPYRIGHT NOTICE

A portion of the disclosure of this patent document contains material that is subject to copyright protection. The copyright owner has no objection to reproduction of the patent document or patent disclosure as it appears in the Patent and Trademark Office, patent file or records, but otherwise reserves all copyright rights whatsoever.

REFERENCE TO COMPUTER PROGRAM LISTING APPENDIX

This application includes two identical compact discs, each containing one file named "P8069 Computer Program Listing Appendix", created on Jul. 16, 2003, size 100,421 bytes, the contents of which is hereby incorporated by reference in its entirety.

BACKGROUND OF THE INVENTION

Efforts exist in the computer server industry to develop standards for accessing hardware components in a computer system. The focus of these efforts is to create manageable hardware building blocks that share management data through a standard interface. One goal of developing such a standard is to enable a plug-and-play-type architecture for hardware similar to that which is available for software.

One standard for accessing hardware components, known as the Intelligent Platform Management Interface (IPMI), enables construction of scalable systems and utilization of modular building blocks (such as baseboards, extension boards, chassis, peripherals, etc.) from multiple vendors, while creating completely manageable system. By providing built-in management capabilities, a total cost of ownership for servers and computer systems may be significantly reduced. Often, these costs are hidden from consumers until after acquisition, thereby making them particularly invidious. IPMI-compliant hardware provides data regarding hardware components to software components on a managed computer system. The IMPI interface is a basis for gathering significant amounts of management data required by hardware developers.

Referring to FIG. 1, remote management of an IPMI-compliant server (comprised of IPMI-enabled hardware components) is possible today through the host instrumentation executing on the server operating system otherwise controlling the operation and interaction fo the hardware components. Several standards like the Desktop Management Interface (DMI), Common Information Model (CIM) and Simple Network Management Protocol (SNMP) define standard frameworks to access the management data through the operating system-based services.

On some server systems, it is also possible for the IPMI data to be accessed (known as "out-of-band" access) without passing through the server operating system, using a User Datagram Protocol (UDP) messaging format. This out-of-band access is available via modem, serial and local area network (LAN) connections. However, there are no mechanisms to enable remote access, such as true web-based access to this management data. The remote access mechanisms used today are limited to intranets and do not work well across large distributed networks, such as the Internet, due to the presence of firewalls and their concomitant variability. In order to make the IPMI data available to the ubiquitous Internet web-browser applications, there is a need to devise a new architecture to enable this access.

Another effort exists to make hardware components (e.g., processors, chipsets, devices), baseboards and systems completely manageable. One goal of this effort is to reduce the total cost of ownership of computer systems. One implementation of this effort exists through the Desktop Management Interface (DMI) that is becoming available on most major operating systems.

DMI is a standard that defines an inherently open framework for building manageability into desktop systems and servers. The DMI interface provides component vendors a consistent and non-proprietary way to make their products manageable. Numerous vendors have made their hardware and software products DMI-enabled, and management applications have leveraged DMI as part of their value-added capability. DMI includes a format for describing management functions, a service provider entity and two sets of application programming interfaces (APIs). One set of APIs is provided for service providers and management applications to interact, and another set of APIs are provided for service providers and instrumentation (or instrumentation software) to interact. DMI also provides a set of services for facilitating remote communication.

Turning to FIG. 2, DMI procedural interfaces are designed to be remotely accessible through the use of Remote Procedure Calls (RPCs) from a remote management application. The RPCs supported by the DMI include The Open Group's Distributed Computing Environment RPC (DCE/RPC), Sun Microsystems' Open Network Computing RPC (ONC/RPC) and Sun Microsystems' Transport Independent RPC (TI/RPC). The RPC interfaces defined by the standards are being used today. However, the RPC mechanisms are limited to intranets and do not work well across large, distributed networks, such as the Internet due in part to the presence of firewalls. Security for the access to the DMI data is also an issue, while accessing the DMI data via the RPC mechanisms. Consequently, DMI data is not available to the ubiquitous Internet Web-browser applications.

The present invention is therefore directed to the problem of developing a method and apparatus for accessing hardware component information without passing through the operating system, yet does so over large, distributed networks, such as the Internet, which networks potentially include firewalls, thereby making hardware component information accessible to Internet Web-browser applications.

SUMMARY OF THE INVENTION

The present invention solves this problem by providing a web-based browser adapter that converts web-based instructions to hardware component based instructions and converts hardware component information and data to a web-based browser compatible format.

DETAILED DESCRIPTION

Figure 1:
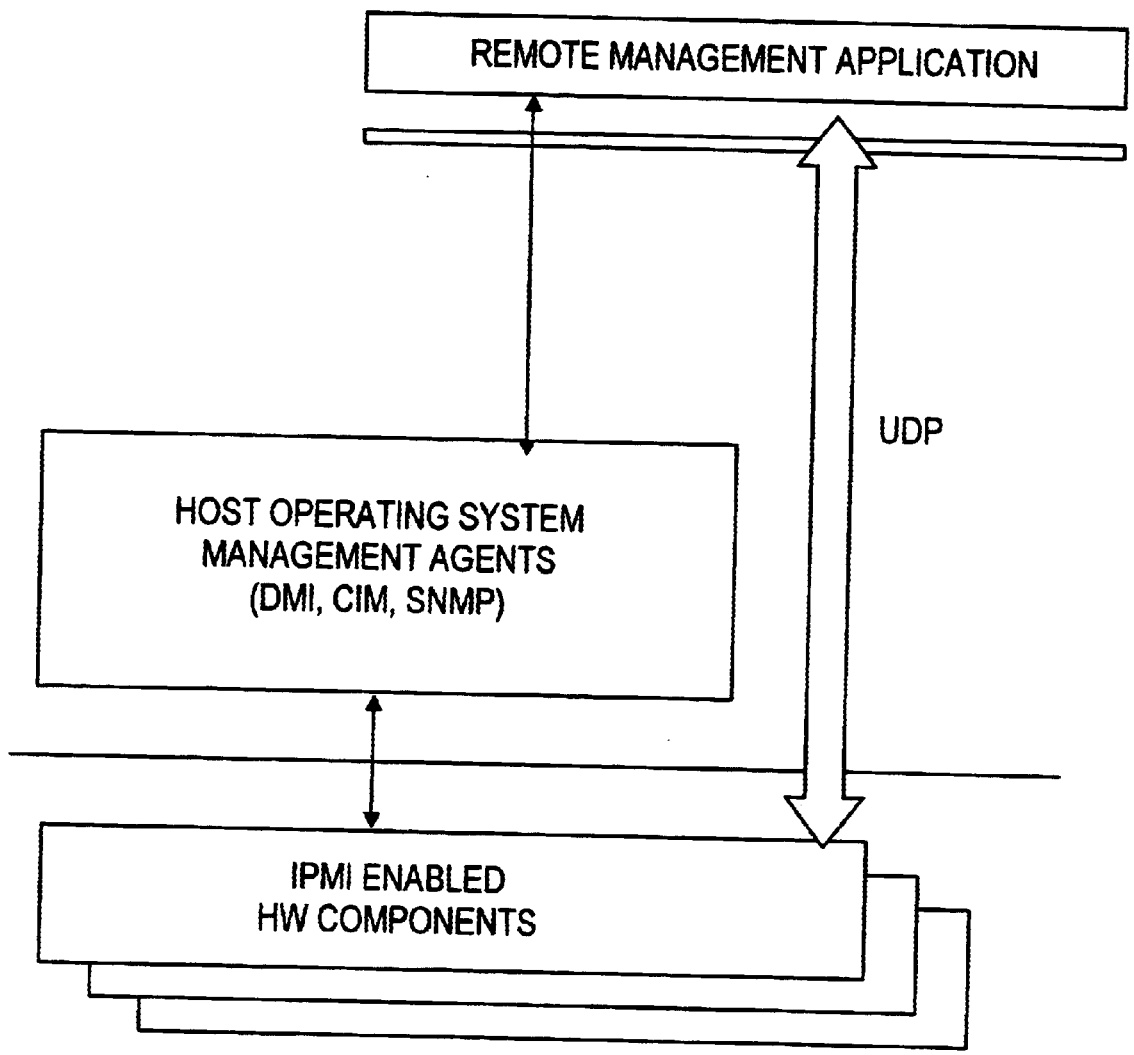
FIG. 1 depicts a remote management application accessing IPMI-enabled hardware components directly without passing through the operating system otherwise controlling the IPMI-enabled hardware components.
Figure 2:
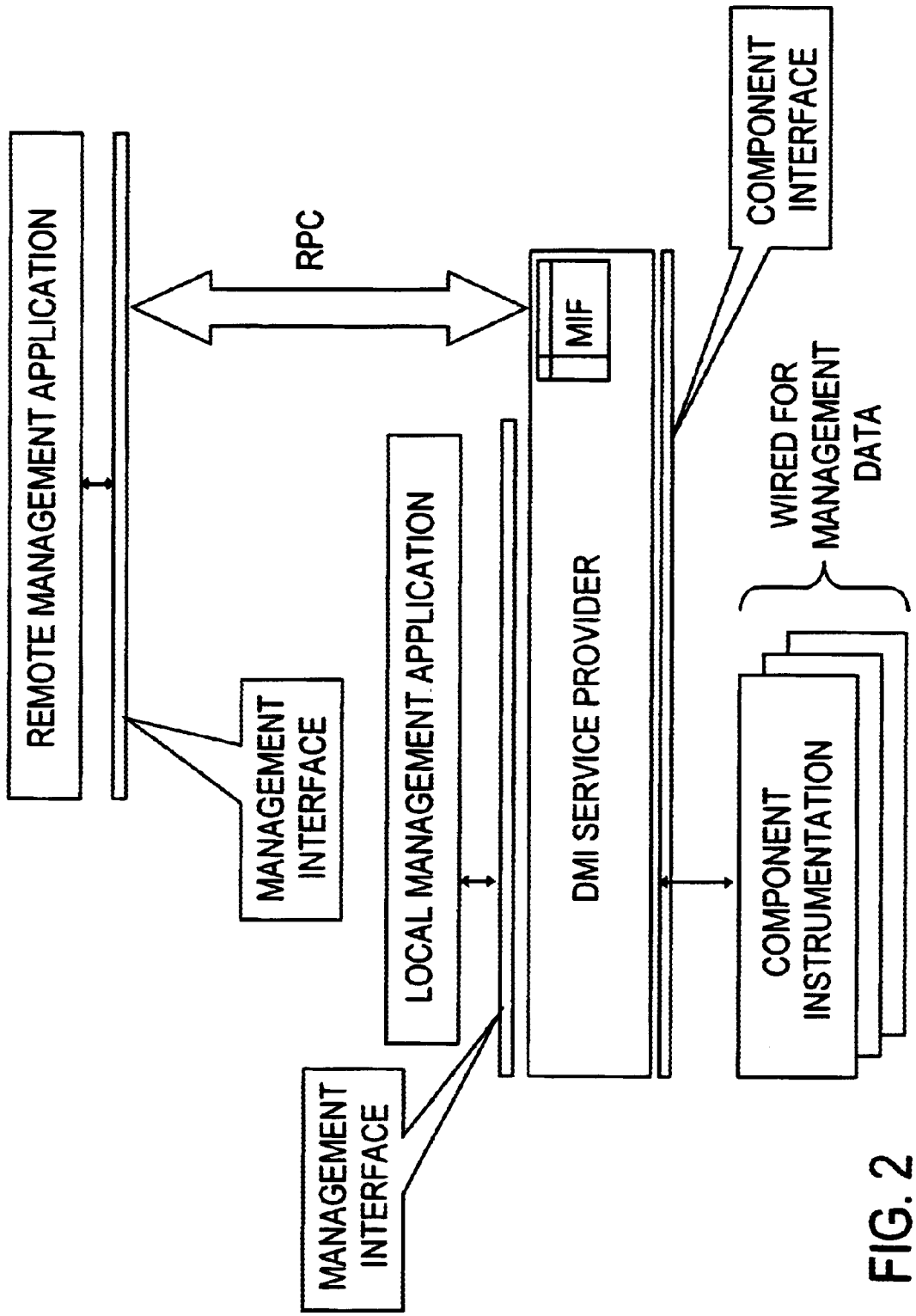
FIG. 2 depicts a remote management application accessing component instrumentation through a DMI service provider directly without passing through the local management application otherwise controlling the DMI service provider.

It is worthy to note that any reference herein to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The embodiments of the invention enable remotely executing programs to access hardware components and upload component management information from these hardware components. For example, one possible implementation of the invention includes a web-based browser application executing on a personal computer, which is connected to the Internet. A second computer, also connected to the Internet via a point-of-presence (POP) server, for example, hosts the hardware components that the web-based browser application wishes to access. The operating system of the second computer controls the operation of the hardware components.

An adapter routine executing on a server, to which the hardware components are coupled and are capable of transferring component information in a predetermined format, serves as an intermediary between the web-based browser application and the hardware components. The format that the data is being transferred from the hardware components to the adapter routine is not compatible with the web-based browser application. The adapter routine converts data from the hardware components to a format acceptable to the web-based browser application, such as, for example, XML over HTTP, or any other computer language acceptable to the web-based browser application. The adapter routine also converts commands from the web-based browser application to the predetermined format required by the hardware components, such as, for example, IPMI or DMI. (Actually, DMI uses IPMI to interface with the hardware.) Consequently, the invention enables the web-based browser application to interact with the hardware components in a way that was heretofore not possible.

As used herein the term "server" is used in the singular for simplicity of description, however, a "server" may be embodied as a plurality of data processing machines that form a common hardware platform. As is consistent with usage in the art, however, these plural server machines are referred to collectively as a "server" (singular).

The processor controlling the computers described herein can be a general-purpose microprocessor, such as the Pentium series microprocessor manufactured by the Intel Corporation of Santa Clara, Calif. In another embodiment, the processor can be an Application Specific Integrated Circuit (ASIC), which has been designed to implement in its hardware and/or firmware at least a part of a method in accordance with an embodiment of the present invention.

The memory for the computers described herein can be any device capable of storing analog or digital information, such as a hard disk, Random Access Memory (RAM), Read Only Memory (ROM), flash memory, a compact disk, a magnetic tape, a floppy disk, and any combination thereof.

Each of the computers described herein includes an input/output (I/O) device, which can be an audio and/or visual device, including, for example, a monitor, display, keyboard, keypad, touch pad, pointing device, microphone, speaker, video camera, camera, scanner, printer, and/or port to which an I/O device can be attached or connected.

Alternatively, the input/output device can be a graphical user interface, which includes, for example, a web browser executing on the computer accessing web pages from a server over a computer network, such as the Internet. The graphical user interface can also include a mouse, a display and a memory, such as a video memory in the computer. The combination of these elements enables the user to select and navigate through various web pages, as required to access the adapter routine used in the embodiments.

In one embodiment, a graphical user interface executes on the personal computer, which graphical user interface interacts with the user to create and display the interface to the adapter routine.

Figure 3:
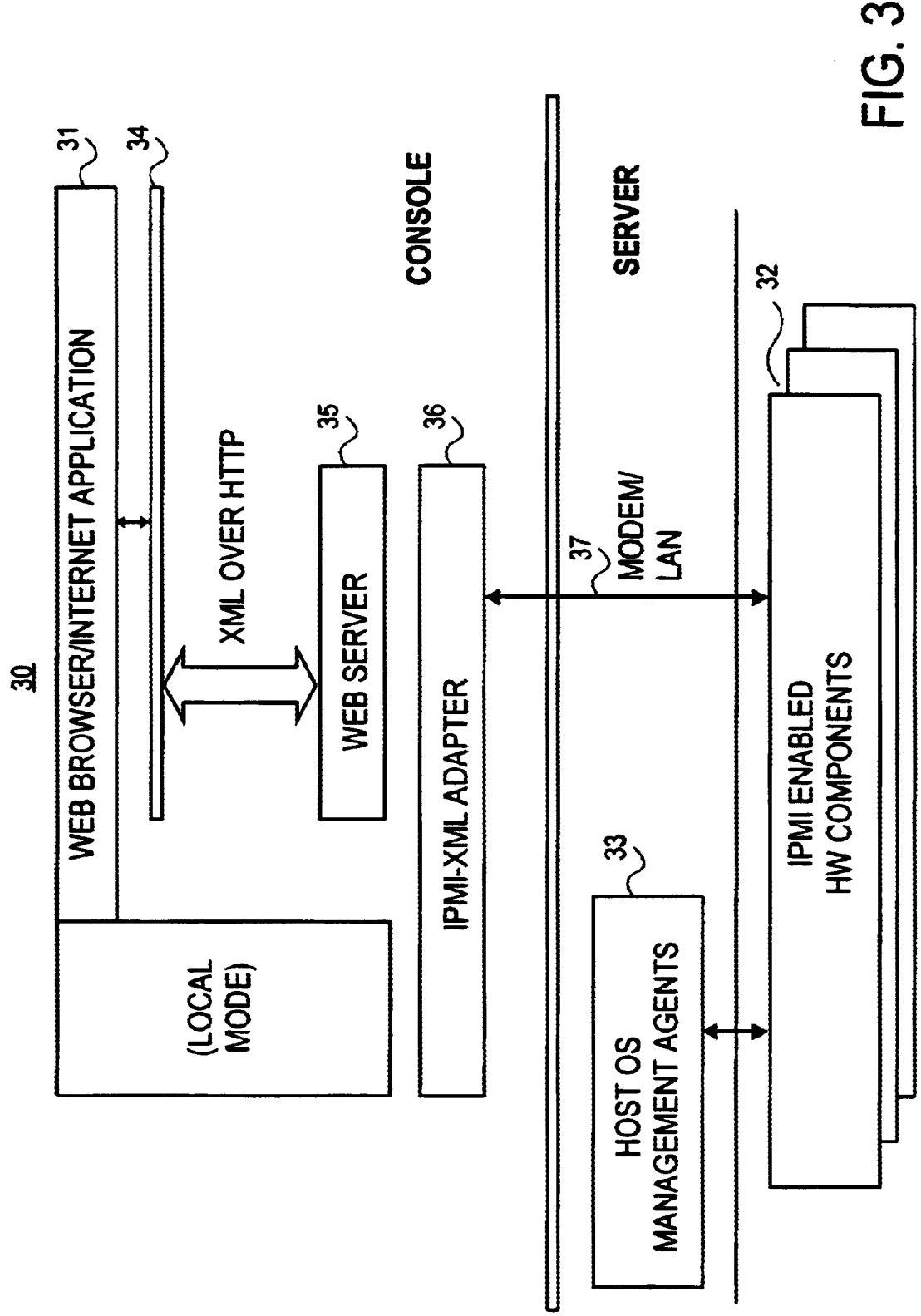
FIG. 3 depicts a web browser/Internet Application that is accessing IPMI-enabled hardware components directly without passing through the operating system otherwise controlling the IPMI-enabled hardware components using an exemplary embodiment of the IPMI-XML adapter.

Exemplary Embodiment of Web-based Access to Intelligent Platform Management Data FIG. 3 depicts a block diagram of a system 30 for enabling a Web-based browser/Internet application 31 to access IPMI-enabled components 32 without passing through the host operating system management agents 33 otherwise controlling the IPMI-enabled hardware components 32 to access IPMI management data. While the connection may occur remotely, the web-based browser/Internet application is able to access the IPMI management data without first (or ever) accessing the operating system otherwise controlling the hardware. Thus, the web-based browser/Internet application can access the hardware components independently of the operating system that otherwise controls the functionality of the hardware components.

The Web-based browser/Internet application 31 accesses the Internet using its normal access point, such as a point of presence (POP) server 34, which may be accessed via telephone modem, cable modem, local area network, intranet or by any other means. The server 34 in turn may access another server 35 or servers to eventually reach the server on which is executing the adapter routine 36.

An IPMI-XML adapter routine 36 that is executing on the server 35 converts the XML commands and data transmitted by the web browser/internet application 31 into IPMI commands and data. The IPMI commands and data are transmitted from the web server 35 that is executing the IPMI-XML adapter routine 36 to the IPMI-enabled components 32 via a modem, local area network, parallel, serial or other connection 37.

Between all servers 35 and 36, the data is transmitted using Internet Protocol (IP) in the form of XML over HTTP. Between the server 36 and the IPMI-enabled components 32, the information is transmitted in IPMI format.

Although the term "server" is used in the singular for simplicity of description, the term "server" is preferably embodied as a plurality of data processing machines that form a common hardware platform. As is consistent with usage in the art, however, these plural server machines are referred to collectively as a "server" (singular).

The main components of this embodiment include the IPMI-XML Adapter 36 and the wire protocol for exchanging the IPMI data over the Internet HTTP protocol.

Extensible Markup Language (XML) is being used today for various eCommerce solutions and for business-to-business communications. XML is similar to HTML, but is not restricted to simply display tags. XML allows structuring of the data.

Every XML tag has the semantics of the data behind it. A Document Type Definition (DTD) defines the semantics and the syntax (i.e., grammar) of an XML document. XML documents can be transferred via the HTTP protocol just like the HTML documents are done today. Use of XML formatted documents allows web-based access to the data. The data can also be transmitted over secure HTTP or HTTPS protocol that uses the Secure Socket Layer to provide security on the wire.

The concept demonstrated herein applies the strong benefits of the XML to access the IPMI information available from a large number of Internet Application-based systems.

XML Encoding

The method defined herein for encoding the IPMI data is very simple and easy to use to encode the IPMI data, yet powerful. A simple web browser can use the Style Sheets to display the data to the user.

The following table demonstrates how the management data for a System Processor is encoded in an XML document.

```
<Temperature>
    <CurrentValue> 55 </CurrentValue>
    <UpperFatalThreshold> 120 </UpperFatalThreshold>
    <NominalValue> 40 <NominalValue>
    <Status> OK </Status>
    -----
    -----
</Temperature>
```

The Document Type Definition (DTD) for the above XML document defines what the various possible options are for the values of various XML tags. For example, the value of the <Status> may be limited to one of a set of strings.

The format of the data is independent of any implementation. The data is returned in exactly the same manner irrespective of the target. The XML document can be easily retrieved from all the systems on the network, and processed by a web browser.

IPMI-XML Adapter

The IPMI-XML Adapter allows an abstracted web-enabled interface to the IPMI data. The adapter retrieves the IPMI data from the target IPMI hardware using the existing remote interfaces via modem, local area network (LAN) or serial connections.

Using this adapter, it is very easy to write a web-enabled browser based application that can either directly interface with the Adapter or can interface with the adapter through a web server and thus, access the IPMI data over the HTTP protocol from anywhere on the Internet.

The IPMI-XML adapter fields and parses the HTTP requests to manage (get/set) the management data. In addition, the IPMI-XML adapter decodes the XML data received from the browser and interfaces with the IPMI hardware to retrieve/manage the data. The IPMI-XML adapter also encodes the IPMI data as an XML document and sends the response back to the browser.

The embodiment enables web browser-based management of the Intelligent Platform Management Data (IPMI and others). Moreover, the embodiment enables management of remote hardware through existing Internet firewalls while providing secure access using Secure HTTP or HTTPS. The embodiment also provides operating system independent mechanisms, which allows for better management irrespective of the console operating system. By doing so, the invention ultimately reduces the total cost of ownership by providing better access to the management data. Moreover, the invention makes server systems more manageable (and independent of the operating system environments). Management consoles are now better able to manage server systems by utilizing the web-based access made possible by the invention. Furthermore, some legacy systems can be instantly managed via a web-based console.

Exemplary Embodiment of Web-Based Access to Wired for Management Data

Figure 4:
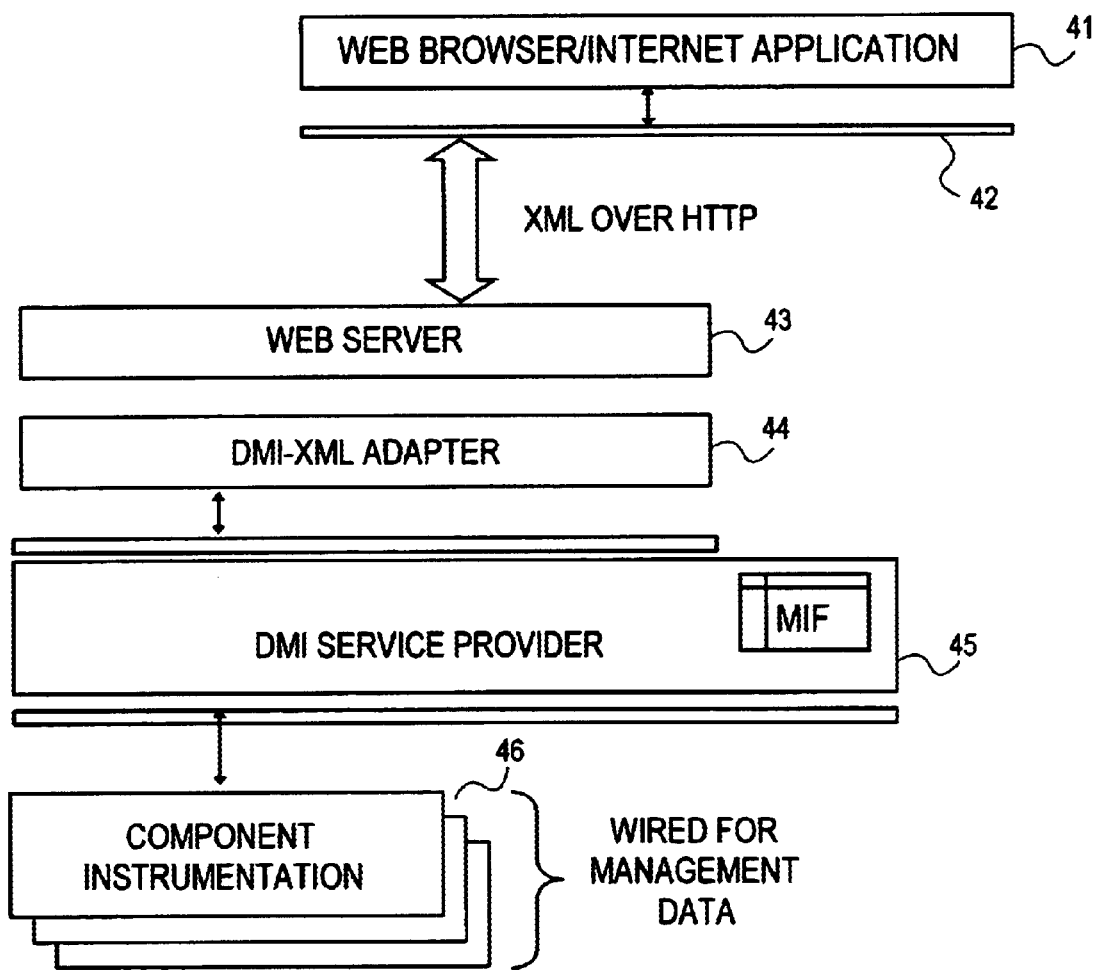
FIG. 4 depicts a web browser/Internet Application accessing component instrumentation using an exemplary embodiment of the DMI-XML adapter interfacing with the DMI service provider.

FIG. 4 provides an overview of a system 40 for enabling a Web-based browser/Internet Application 41 to access Wired for Management (WFM) data. The Web-based browser/Internet Application 41 accesses the Internet using its normal access, such as a point-of-presence server 42, which in turn may access another server 43 executing the DMI-XML adapter program 44. As in the IPMI embodiment, the web-based browser application accesses the Internet via telephone modem, cable modem, intranet, local area network or any other means.

The DMI-XML adapter program 44 executing on the server 43 enables the server 43 to interface with the DMI service provider 45, which in turn accesses the component instrumentation 46 to provide the wired for management data. The main components of this embodiment 40 include the DMI-XML Adapter 44 and the wire protocol for exchanging the DMI data over the Internet HTTP protocol.

The concept demonstrated herein applies the strong benefits of the XML to the DMI and the Wired for Management information available from a large number of Internet Application based systems.

XML Encoding

The method defined herein for encoding the DMI data is very simple, and easy to use to encode the DMI data, yet is very powerful. A simple web browser can use the Style Sheets to display the data to the user.

The following table demonstrates how the management data for a System Processor is encoded in an XML document.

```
<Processor>
    <Architecture> Intel </Architecture>
    <Family> Pentium Family </Family>
    <Model> Pentium II Xeon </Model>
    <Current Speed> 450 </Current Speed>
```

-continued

```
<CPU Status> Enabled </CPU Status>
<Unique ID> 0012874563 </Unique ID>
-----
-----
</Processor>
```

The Document Type Definition (DTD) for the above XML document defines what the various possible options are for the values of various XML tags. For example, the value of the <Architecture> may be limited to one of a set of strings. The format of the data is independent of any operating system behavior. The data is returned in exactly the same manner irrespective of the target. The XML document can be easily retrieved from all the systems on the network, and processed by a web browser.

DMI-XML Adapter

The DMI-XML Adapter is the interface between the Web Server and the DMI Service Provider. All of these components exist on the managed system. The Web Server, then acts as the conduit to the Internet browsers running anywhere on the Internet. The browser can also run on the same system as the managed system.

The DMI-XML adapter fields and parses the HTTP requests to manage (get/set) the management data, decodes the XML data received from the browser, and interfaces with the DMI Service Processor to retrieve/manage the data. In addition, the DMI-XML adapter encodes the DMI data as an XML document and sends the response back to the browser.

The embodiment enables browser-based management of the DMI-based management data, which management is possible even through existing firewalls. Moreover, the embodiment makes possible this access securely using Secure HTTP or HTTPS. In addition, the embodiment makes operating system independent mechanisms possible, which allows for better management irrespective of the console operating system, thereby ultimately reducing the total cost of ownership by providing better access to the management data. As a result, server systems are more manageable (independent of the operating system environments). Furthermore, the embodiment allows management consoles to better manage server systems by providing the web-based access. In addition, some legacy systems can be instantly managed via a web-based console.

DMI-XML Adapter

The DTD for the DMI-XML adapter follows. Included is a sample XML encoding. The encoding completely encodes the DMI Service Provider Application Program Interface (API) for Management Applications ("the API"), so that all DMI client (remote) functions are supported. Moreover, the encoding maximizes use of XML validation to facilitate encoding/decoding.

A DMI encoder can simply pass values to an XML encoder in the same order as defined in the API. A decoder can assume that an XML document, which is "valid" against the DTD, contains the correct request or response parameters, and the correct structure members, in the same order as defined in the API.

Furthermore, the encoding encodes DMI enumerations by tag rather than by value, again taking maximum advantage of XML validation. Additionally, the DTD uses fixed XML attributes to associate enumeration values with tag names, so that decoders need not know that association—they can derive enumerated values directly from the tag name. In addition, the encoding employs an extremely straightforward mapping to facilitate implementation.

In all cases, the XML element name can be derived by removing the "DMI" prefix and the "_t" suffix from the name of the corresponding DMI API data type. For instance, the API type "DmiAttributeValues_t" is encoded in XML by the "AttributeValues" element.

Moreover, the encoding makes use of fixed XML attributes, which minimizes XML document size (and thus networking overheads). Fixed attributes are constants, and thus need not be specified in the encoded XML document. Rather, they are easily retrieved from the DTD itself through standard XML parser APIs. (Note that the DTD is transmitted to a client or server only once.)

Finally, the encoding simplifies implementation of encoders and decoders. XML requires that all element values be represented as character data. Encoders/decoders must therefore convert between local machine-specific (i.e., binary) data representations and the corresponding XML character representation. Because the DTD includes an XML attribute, which identifies the on-the-wire and end-system data representation of each element, encoders/decoders need only understand a small fixed set of data types. As before, the use of a fixed attribute means that this type of information is not transmitted over the wire.

The above described embodiments may be encoded and stored in a computer readable media, including but not limited to a CD-ROM, magnetic memory, optical memory, computer disk, which media is then used to instruct a processor to perform the methods described herein. Alternatively, the encoding may be stored on a server coupled to the Internet via which various applications may access the encoding and execute the instructions included therein.

Although various embodiments are specifically illustrated and described herein, it will be appreciated that modifications and variations of the invention are covered by the above teachings and within the purview of the appended claims without departing from the spirit and intended scope of the invention. For example, while several of the embodiments depict the use of specific data management and interface standards, other data management and interfaces will suffice. Moreover, while specific program and protocols are included, other protocols (including subsequently developed protocols) may be sufficient to implement the embodiments described herein. These examples should not be interpreted to limit the modifications and variations of the invention covered by the claims but are merely illustrative of possible variations.

What is claimed is:

1. A method for accessing component information from a hardware component in a computer which access bypasses an operating system executing on the computer, comprising:

accessing a web browser application executing on a web server;

coupling the web browser application to a web server to which the hardware component is coupled;

executing an adapter program that converts component information in a first format to component information in a second format;

transferring hardware component information from the hardware component to the adapter program in the first format; and transferring the hardware component information to the web browser application in the second format.

2. The method according to claim 1, wherein the first format includes IPMI.

3. The method according to claim 1, wherein the first format includes DMI.

4. The method according to claim 1, wherein the second format includes XML.

5. The method according to claim 1, wherein the second format includes one or more of the following: HTML over HTTP and XML over HTTP.

6. The method according to claim 1, wherein the second format includes user defined extensions of XML.

7. The method according to claim 1, wherein the second format includes a format compatible with web browsers.

8. The method according to claim 1, wherein the adapter program accesses the component over one of the following: a modem connection, LAN, intranet, internet and computer connection.

9. The method according to claim 1, wherein the adapter program accesses the component via a DMI service provider program executing on a server coupled to the component.

10. An apparatus for remotely accessing hardware component information in a hardware component, comprising:
- a remote computer executing a web-based browser application, said web-based browser application sending commands and data to the hardware component in a first format; and
- a remote server executing an adapter program, said remote server being coupled to the hardware component via a computer network and being coupled to the the remote computer, said adapter program receiving the commands and data from the web-based browser application in the first format and converting the commands and data from the web-based browser application in the first format into a second format suitable for the hardware component.

11. The apparatus according to claim 10, wherein the adapter program receives data in the second format from the hardware component and converts the data from the second format into the first format suitable for the web-based browser application.

12. The apparatus according to claim 10, wherein the second format includes IPMI.

13. The apparatus according to claim 10, wherein the second format includes DMI.

14. The apparatus according to claim 10, wherein the first format includes XML.

15. The apparatus according to claim 10, wherein the first format includes HTML or XML over HTTP.

16. The apparatus according to claim 10, wherein the first format includes user defined extensions of XML.

17. The apparatus according to claim 10, wherein the first format includes a format compatible with web browsers.

18. The apparatus according to claim 10, wherein the server accesses the hardware component over one of the following: a modem connection, LAN, intranet, internet and computer connection.

19. The apparatus according to claim 10, wherein the remote server accesses the hardware component via a DMI service provider program executing on another remote server coupled to the hardware component.

* * * * *